US012756207B2

(12) United States Patent
Park

(10) Patent No.: US 12,756,207 B2
(45) Date of Patent: Oct. 6, 2026

(54) BATTERY MANAGEMENT APPARATUS AND OPERATING METHOD THEREOF

(71) Applicant: LG ENERGY SOLUTION, LTD., Seoul (KR)

(72) Inventor: Myeong Hui Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 792 days.

(21) Appl. No.: 18/024,895

(22) PCT Filed: Jan. 6, 2022

(86) PCT No.: PCT/KR2022/000201
§ 371 (c)(1),
(2) Date: Mar. 6, 2023

(87) PCT Pub. No.: WO2022/149864
PCT Pub. Date: Jul. 14, 2022

(65) Prior Publication Data
US 2023/0344248 A1 Oct. 26, 2023

(30) Foreign Application Priority Data
Jan. 8, 2021 (KR) ........................ 10-2021-0002902

(51) Int. Cl.
*H02J 7/56* (2026.01)

(52) U.S. Cl.
CPC ..................................... *H02J 7/56* (2026.01)

(58) Field of Classification Search
CPC ..................................................... H02J 7/0019
USPC .......................................................... 320/155
See application file for complete search history.

(56) References Cited

U.S. PATENT DOCUMENTS

| | | | | |
|---|---|---|---|---|
| 10,581,124 | B2 * | 3/2020 | Nakatsuka | H02J 7/0063 |
| 11,043,706 | B2 * | 6/2021 | Huff | H01M 50/209 |
| 11,070,065 | B2 * | 7/2021 | Abdel-Monem | G01R 31/392 |
| 2007/0285058 | A1 | 12/2007 | Kuroda | |
| 2009/0261782 | A1 | 10/2009 | Morita | |
| 2010/0134068 | A1 | 6/2010 | Lim | |

(Continued)

FOREIGN PATENT DOCUMENTS

| | | | |
|---|---|---|---|
| EP | 2 043 219 | A1 | 4/2009 |
| JP | 2007-318950 | A | 12/2007 |

(Continued)

OTHER PUBLICATIONS

Supplementary European Search Report for European Application No. 22736841.2, dated Mar. 12, 2024.

(Continued)

*Primary Examiner* — Suchin Parihar
(74) *Attorney, Agent, or Firm* — Birch, Stewart, Kolasch & Birch, LLP

(57) ABSTRACT

A battery management apparatus according to an embodiment can include a plurality of balancing resistors respectively connected to a plurality of battery cells, a common resistor connected in parallel to the plurality of balancing resistors, a plurality of resistive switches connected between the plurality of balancing resistors and the common resistor, and a controller for calculating balancing times of the plurality of battery cells and control operations of the plurality of resistive switches based on the balancing times.

16 Claims, 6 Drawing Sheets

(56) References Cited

U.S. PATENT DOCUMENTS

| | | | | |
|---|---|---|---|---|
| 2014/0042972 | A1* | 2/2014 | Kim | H02J 7/0016 320/118 |
| 2014/0049222 | A1* | 2/2014 | Moorhead | H02J 7/0016 320/134 |
| 2016/0159243 | A1* | 6/2016 | Park | B60L 3/0046 320/136 |
| 2017/0237269 | A1* | 8/2017 | Chang | H02J 7/0016 320/118 |
| 2018/0226808 | A1* | 8/2018 | Kang | H02J 7/0016 |
| 2018/0316197 | A1* | 11/2018 | Zhang | H02J 7/0019 |
| 2019/0280489 | A1* | 9/2019 | Hidaka | H02J 7/54 |
| 2019/0288520 | A1* | 9/2019 | Abdel-Monem | G01R 31/392 |
| 2020/0028369 | A1 | 1/2020 | Lupo | |
| 2020/0153262 | A1 | 5/2020 | Yoon | |
| 2020/0389034 | A1 | 12/2020 | Hong et al. | |
| 2021/0075067 | A1 | 3/2021 | Yoon | |
| 2021/0265671 | A1 | 8/2021 | Chung | |
| 2022/0166239 | A1 | 5/2022 | Yoon | |
| 2024/0044999 | A1* | 2/2024 | Park | G01R 31/392 |

FOREIGN PATENT DOCUMENTS

| | | | |
|---|---|---|---|
| KR | 10-2017-0065322 | A | 6/2017 |
| KR | 10-2018-0035080 | A | 4/2018 |
| KR | 10-1865969 | B1 | 6/2018 |
| KR | 10-2019-0000142 | A | 1/2019 |
| KR | 10-2019-0047601 | A | 5/2019 |
| KR | 10-2019-0078896 | A | 7/2019 |
| KR | 10-2020-0022791 | A | 3/2020 |
| KR | 10-2020-0041706 | A | 4/2020 |
| KR | 10-2020-0044574 | A | 4/2020 |
| KR | 10-2020-0084710 | A | 7/2020 |

OTHER PUBLICATIONS

International Search Report for PCT/KR2022/000201 (PCT/ISA/210) mailed on Apr. 8, 2022.

* cited by examiner

BATTERY MANAGEMENT APPARATUS AND OPERATING METHOD THEREOF

TECHNICAL FIELD

Cross-Reference to Related Application

This application claims priority to and the benefit of Korean Patent Application No. 10-2021-0002902 filed in the Korean Intellectual Property Office on Jan. 8, 2021, the entire contents of which are incorporated herein by reference.

TECHNICAL FIELD

Embodiments disclosed herein relate to a battery management apparatus and an operating method thereof.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices. In addition, the lithium-ion battery is attracting attention as a next-generation energy storage medium as a usage range thereof is expanded to a power source of electric vehicles.

Generally, a lithium-ion battery may be implemented with a plurality of battery cells to supply power. The plurality of battery cells may have a voltage difference due to a chemical difference, a physical difference, an aging degree difference, etc., and the voltage difference causes a difference in a charging/discharging time and a charging/discharging amount of each battery cell in a situation where charging and discharging of the battery cell continues. A battery cell having undergone a lot of degradation has a shorter charging/discharging time than other battery cells and thus is first fully charged or discharged, such that charging or discharging of relatively less degraded battery cells is terminated before they are fully charged or discharged. To solve these problems, various cell balancing techniques for a plurality of battery cells have been introduced.

DETAILED DESCRIPTION OF THE INVENTION

Technical Problem

Embodiments disclosed herein provide a battery management apparatus and an operating method thereof in which a speed of a cell balancing operation may be increased.

Technical problems of the embodiments disclosed herein are not limited to the above-described technical problems, and other unmentioned technical problems would be clearly understood by one of ordinary skill in the art from the following description.

Technical Solution

A battery management apparatus according to an embodiment disclosed herein includes a plurality of balancing resistors respectively connected to a plurality of battery cells, a common resistor connected in parallel to the plurality of balancing resistors, a plurality of resistive switches connected between the plurality of balancing resistors and the common resistor, and a controller configured to calculate balancing times of the plurality of battery cells and control operations of the plurality of resistive switches based on the balancing times.

In an embodiment, the controller may be further configured to select at least one target battery cell among the plurality of battery cells based on the balancing times of the plurality of battery cells.

In an embodiment, the controller may be further configured to select, as the at least one target battery cell, a battery cell having a balancing time that is different from balancing times of other battery cells by a reference value or greater among the plurality of battery cells.

In an embodiment, the controller may be further configured to control the operations of the plurality of resistive switches to electrically connect a balancing resistor, connected to the at least one target battery cell among the plurality of balancing resistors, with the common resistor.

In an embodiment, the controller may be further configured to control the operations of the plurality of resistive switches to avoid electrical connection between a balancing resistor connected to a battery cell other than the at least one target battery cell among the plurality of balancing resistors and the common resistor.

In an embodiment, the battery management apparatus may further include a plurality of balancing switches respectively connected to the plurality of balancing resistors.

In an embodiment, the controller may be further configured to close a balancing switch connected to a respective one of the balancing resistors connected to the at least one target battery cell among the plurality of balancing switches, when controlling the operations of the plurality of resistive switches to electrically connect the respective balancing resistor with the common resistor.

An operating method of a battery management apparatus according to an embodiment disclosed herein includes calculating balancing times of a plurality of battery cells, selecting at least one target battery cell among the plurality of battery cells, based on the balancing times, and controlling an operation of a resistive switch disposed between a balancing resistor, connected to the at least one target battery cell among the plurality of balancing resistors, and a common resistor connected in parallel to the balancing resistor.

In an embodiment, the selecting of the at least one target battery cell among the plurality of battery cells based on the balancing times may include selecting, as the at least one target battery cell, a battery cell having a balancing time that is different from balancing times of other battery cells by a reference value or greater among the plurality of battery cells.

In an embodiment, the controlling of the operation of the resistive switch disposed between the balancing resistor, connected to the at least one target battery cell among the plurality of balancing resistors, and the common resistor connected in parallel to the balancing resistor may include closing the resistive switch to electrically connect the balancing resistor connected to the at least one target battery cell with the common resistor.

In an embodiment, the battery management method may further include controlling operations of a plurality of balancing switches respectively connected to the plurality of balancing resistors.

In an embodiment, the controlling of the operations of the plurality of balancing switches respectively connected to the plurality of balancing resistors may include closing a balancing switch connected to the balancing resistor connected to the at least one target battery cell among the plurality of balancing switches, when controlling the operations of the plurality of resistive switches to electrically connect the balancing resistor, connected to the at least one target battery cell among the plurality of balancing resistors, with the common resistor.

Advantageous Effects

A battery management apparatus and an operating method thereof according to an embodiment disclosed herein may quickly solve a cell imbalance situation by increasing a cell balancing speed of a battery cell.

MODE FOR INVENTION

Figure 1:
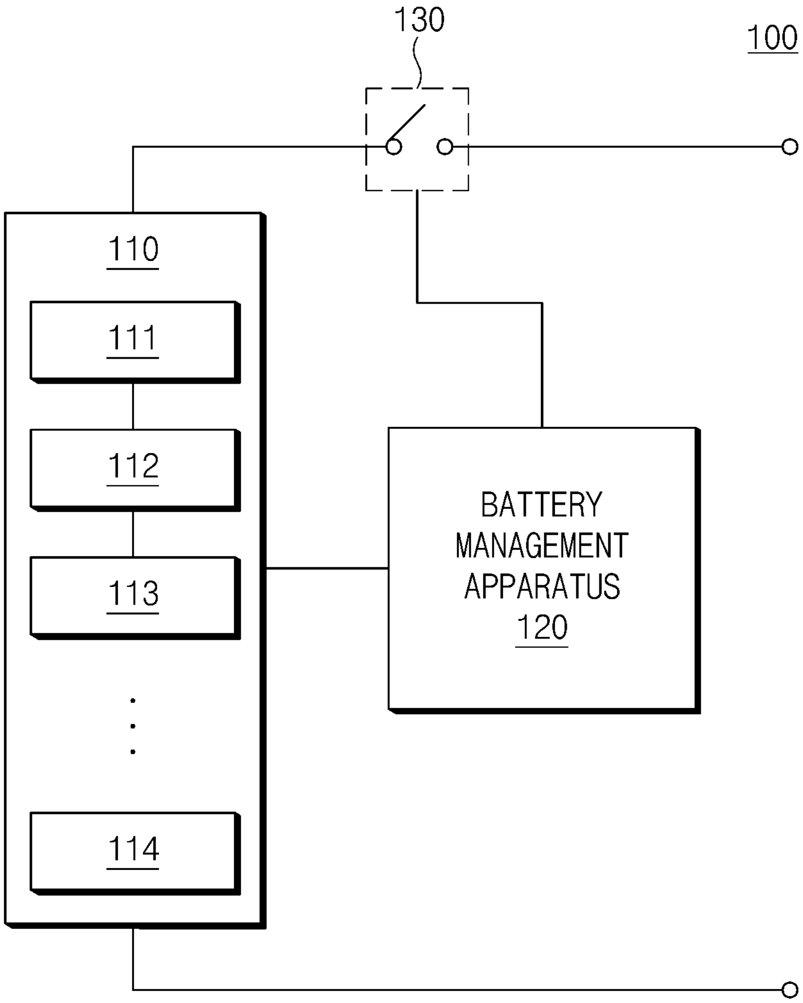
FIG. 1 illustrates a battery pack according to an embodiment disclosed herein.

Hereinafter, embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These term is used merely for distinguishing one component from another component and does not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present application.

FIG. 1 illustrates a battery pack according to an embodiment disclosed herein.

Referring to FIG. 1, a battery pack 100 according to an embodiment disclosed herein may include a battery module 110, a battery management apparatus 120, and a relay 130.

The battery module 110 may include a plurality of battery cells 111, 112, 113, and 114. Although the plurality of battery cells are illustrated as four in FIG. 1, the present invention is not limited thereto, and the battery module 110 may include n battery cells (n is a natural number greater than or equal to 2). The battery module 110 may supply power to a target device (not shown). To this end, the battery module 110 may be electrically connected to the target device. Herein, the target device may include an electrical, electronic, or mechanical device that operates by receiving power from the battery pack 100 including the plurality of battery cells 111, 112, 113, and 114, and the target device may be, for example, an electric vehicle (EV), but is not limited thereto.

The plurality of battery cells 111, 112, 113, and 114 may be a lithium ion (Li-ion) battery, an Li-ion polymer battery, a nickel-cadmium (Ni—Cd) battery, a nickel hydrogen (Ni-MH) battery, etc., and may not be limited thereto. Meanwhile, although one battery module 110 is illustrated in FIG. 1, the battery module 110 may be configured in plural according to an embodiment.

The battery management apparatus 120 may manage and/or control a state and/or an operation of the battery module 110. For example, the battery management apparatus 120 may manage and/or control the states and/or operations of the plurality of battery cells 111, 112, 113, and 114 included in the battery module 110. The battery management apparatus 120 may manage charging and/or discharging of the battery module 110.

In addition, the battery management apparatus 120 may monitor a voltage, a current, a temperature, etc., of the battery module 110 and/or each of the plurality of battery cells 111, 112, 113, and 114 included in the battery module 110. A sensor or various measurement modules for monitoring performed by the battery management apparatus 120, not shown, may be additionally installed in the battery module 110, a charging/discharging path, any position of the battery module 110, etc. The battery management apparatus 120 may calculate a parameter indicating a state of the battery module 110, e.g., a state of charge (SOC), a state of health (SOH) etc., based on a measurement value such as monitored voltage, current, temperature, etc.

The battery management apparatus 120 may control an operation of the relay 130. For example, the battery management apparatus 120 may close the relay 130 to supply power to the target device. The battery management apparatus 120 may close the relay 130 when a charging device is connected to the battery pack 100.

The battery management apparatus 120 may calculate a cell balancing time of each of the plurality of battery cells 111, 112, 113, and 114. Herein, the cell balancing time may be defined as a time required for balancing of the battery cell. For example, the battery management apparatus 120 may calculate a cell balancing time based on an SOC, a battery capacity, and a balancing efficiency of each of the plurality of battery cells 111, 112, 113, and 114.

The battery management apparatus 120 may determine at least one cell balancing target based on the cell balancing time of each of the plurality of battery cells 111, 112, 113, and 114. According to an embodiment, the cell balancing target may be defined as a target battery cell. The battery management apparatus 120 may select at least one target battery cell based on the cell balancing time of each of the plurality of battery cells 111, 112, 113, and 114. For example, the battery management apparatus 120 may select, as at least one target battery cell, a battery cell having a cell balancing time different from those of other battery cells by a reference value or greater, from among the plurality of battery cells 111, 112, 113, and 114.

The battery management apparatus 120 may perform a cell balancing operation on the at least one target battery cell selected as the cell balancing target among the plurality of battery cells 111, 112, 113, and 114, based on the cell balancing time. For example, the battery management apparatus 120 may increase a balancing speed of the at least one target battery cell by increasing a balancing current used for balancing of the at least one target battery cell.

Hereinbelow, a detailed operation of the battery management apparatus 120 will be described with reference to FIGS. 2 and 3.

Figure 2:
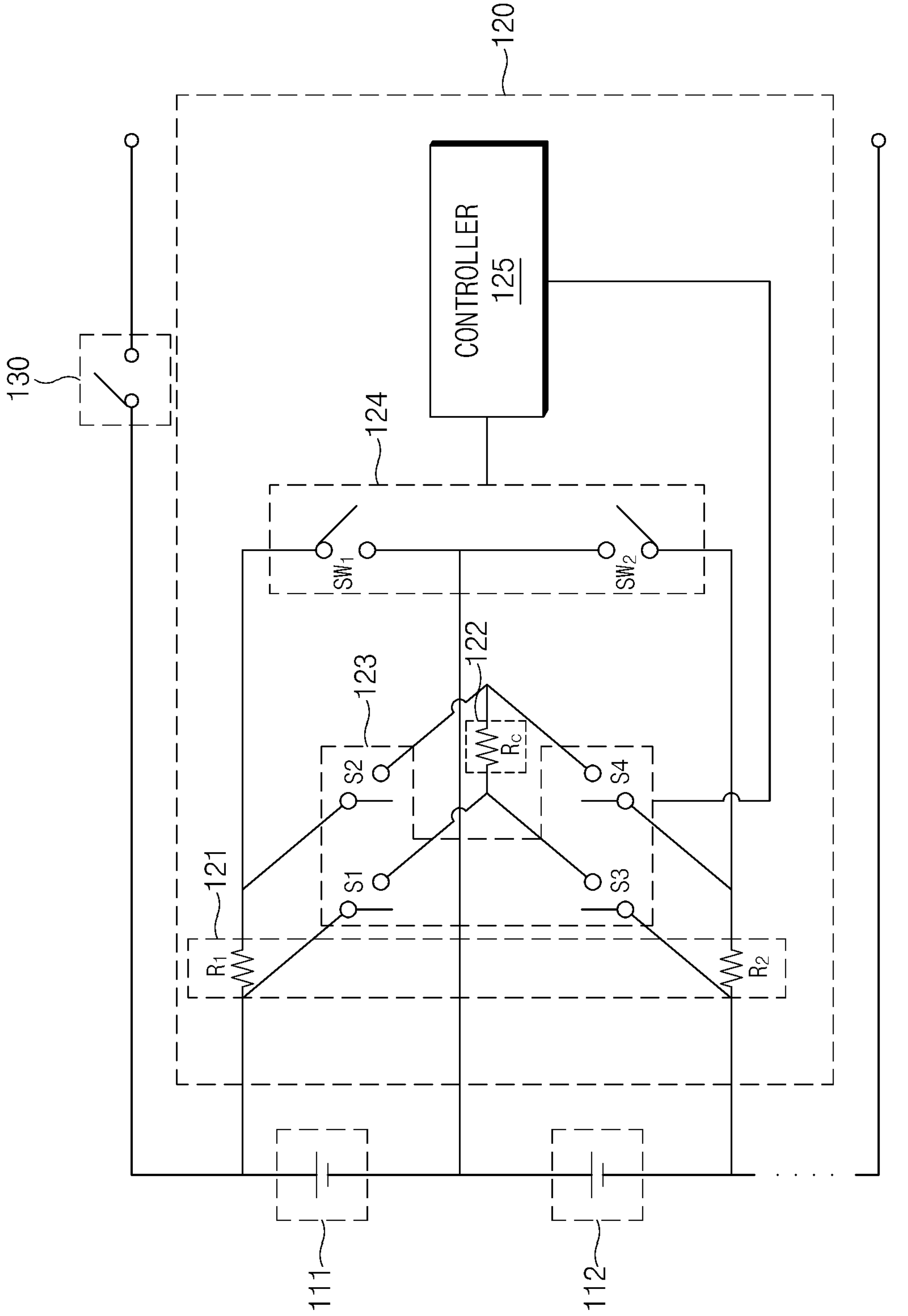
FIG. 2 is a block diagram of a battery management apparatus according to an embodiment disclosed herein.

FIG. 2 is a block diagram of a battery management apparatus according to an embodiment disclosed herein. FIG. 3 is a view for describing an operation of a battery management apparatus, according to an embodiment disclosed herein.

While there are two battery cells 111 and 112 among the plurality of battery cells 111, 112, 113, and 114 in FIG. 2 to help understanding of the technical spirit disclosed herein, the technical spirit disclosed herein may be naturally applied to three or more battery cells.

Referring to FIG. 2, the battery management apparatus 120 according to an embodiment disclosed herein may include a plurality of balancing resistors 121, a common resistor 122, a plurality of resistive switches 123, a plurality of balancing switches 124, and a controller 125.

The plurality of balancing resistors R1 and R2 121 may be connected to the plurality of battery cells 111 and 112, respectively. More specifically, the first balancing resistor R1 may be connected to the first battery cell 111, and the second balancing resistor R2 may be connected to the second battery cell 112. For example, the first balancing resistor R1 may be connected to a positive terminal of the first battery cell 111, and the second balancing resistor R2 may be connected to a negative terminal of the second battery cell 112.

The common resistor Rc 122 may be connected in parallel to the plurality of balancing resistors 121. More specifically, the common resistor Rc 122 may be connected in parallel to the first balancing resistor R1 and the second balancing resistor R2. The common resistor 122 may be electrically connected to the first balancing resistor R1 and the second balancing resistor R2 through a plurality of resistive switches S1, S2, S3, and S4. That is, the common resistor 122 may be connected in parallel to the first balancing resistor R1 when the first resistive switch S1 and the second resistive switch S2 are short-circuited, and the common resistor 122 may be connected in parallel to the second balancing resistor R2 when the third resistive switch S3 and the fourth resistive switch S4 are closed.

The plurality of resistive switches S1, S2, S3, and S4 may be connected between the plurality of balancing resistors 121 and the common resistor 122. The plurality of resistive switches S1, S2, S3, and S4 may be opened or closed in response to a control command received from the controller 125. For example, when the plurality of resistive switches S1, S2, S3, and S4 are closed, the plurality of balancing resistors 121 and the common resistor 122 may be electrically connected. Meanwhile, for example, the first resistive switch S1 and the second resistive switch S2 may be simultaneously opened or closed. The third resistive switch S3 and the fourth resistive switch S4 may be simultaneously opened or closed.

The plurality of balancing switches 124 may be respectively connected to the plurality of balancing resistors 121. For example, the first balancing switch SW1 may be serially connected to the first balancing resistor R1, and the second balancing switch SW2 may be serially connected to the second balancing resistor R2. The first balancing switch SW1 and the second balancing switch SW2 may be opened or closed in response to a control command received from the controller 125.

For example, when the first balancing switch SW1 is closed, a closed loop may be formed in which the first battery cell 111 and the first balancing resistor R1 are electrically connected to each other, to discharge the first battery cell 111, such that a cell balancing operation may be performed on the first battery cell 111. When the second balancing switch SW2 is closed, a closed loop may be formed in which the second battery cell 112 and the second balancing resistor R2 are electrically connected to each other, to discharge the second battery cell 112, such that a cell balancing operation may be performed on the second battery cell 112.

The controller 125 may calculate a cell balancing time of each of the plurality of battery cells 111, 112, 113, and 114 (see FIG. 1).

Figure 3:
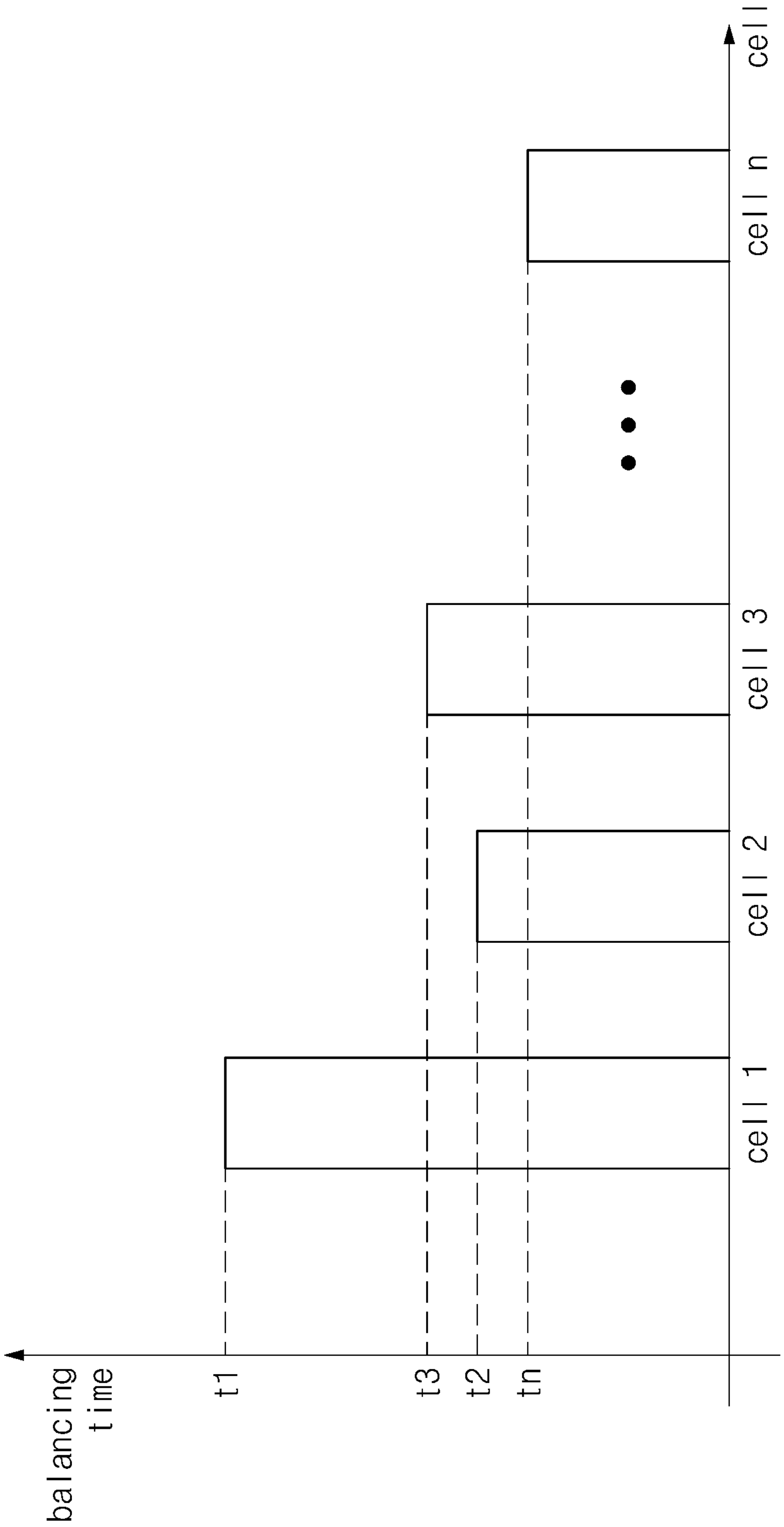
FIG. 3 is a view for describing an operation of a battery management apparatus, according to an embodiment disclosed herein.

Referring to FIG. 3, a result of calculating a cell balancing time of each of the plurality of battery cells 111, 112, 113, and 114, by the controller 125, is shown. For example, the controller 125 may calculate a cell balancing time t1 of a first battery cell (cell 1, 111), a cell balancing time t2 of a second battery cell (cell 2, 112), a cell balancing time t3 of a third battery cell (cell 3, 113), and a cell balancing time tn of an $n^{th}$ battery cell (cell n, 114).

The controller 125 may select at least one target battery cell based on the calculated cell balancing time. The controller 125 may select, as at least one target battery cell, a battery cell having a balancing time different from those of other battery cells by a reference value or greater, from among the plurality of battery cells 111, 112, 113, and 114. For example, the controller 125 may select the first battery cell (cell 1, 111) as a target battery cell when the cell balancing time t1 of the first battery cell (cell 1, 111) is different from the cell balancing times t2, t3, and tn of the second battery cell (cell 2, 112), the third battery cell (cell 3, 113), and the $n^{th}$ battery cell (cell n, 114) by the reference value or greater.

Hereinbelow, a description will be made assuming that at least one target battery cell is the first battery cell (cell 1, 111), but the present invention is not limited thereto, and both the first battery cell 111 and the second battery cell 112 may be selected as target battery cells when the cell balancing time t2 of the second battery cell (cell 2, 112) is different from the cell balancing times t3, and tn of the third battery cell (cell 3, 113) and the $n^{th}$ battery cell (cell n, 114), by the reference value or greater.

Meanwhile, according to an embodiment, the controller 125 may select a battery cell having a maximum cell balancing time and a battery cell having a minimum cell balancing time among the plurality of battery cells 111, 112, 113, and 114, and select the battery cell having the maximum balancing time as a target battery cell.

In addition, according to an embodiment, the controller 125 may select, as target battery cells, battery cells having cell balancing times greater than or equal to a preset value among the plurality of battery cells 111, 112, 113, and 114.

The controller 125 may control operations of the plurality of resistive switches 123 to electrically connect the balancing resistor R1, connected to at least one target battery cell (e.g., the first battery cell 111) among the plurality of balancing resistors 121, with the common resistor RC. For example, when the first battery cell 111 is selected as a target battery cell, the controller 125 may close the first resistive switch S1 and the second resistive switch S2. The controller 125 may also close the first balancing switch SW1.

The controller 125 may control operations of the plurality of resistive switches 123 to avoid electrical connection between a balancing resistor R2 connected to a battery cell (e.g., the second battery cell 112) other than the at least one target battery cell (e.g., the first battery cell 111) among the plurality of balancing resistors 121, and the common resistor RC. For example, when the first battery cell 111 is selected as the target battery cell, the controller 125 may open the third resistive switch S3 and the fourth resistive switch S4.

Meanwhile, when the third resistive switch S3 and the fourth resistive switch S4 are opened, the controller 125 may close the second balancing switch SW2 to perform a cell balancing operation on the second battery cell 112 when cell balancing for the second battery cell 112 is required.

As described above, when the first resistive switch S1 and the second resistive switch S2 are closed, the first balancing resistor R1 and the common resistor Rc 122 may be connected in parallel. In this case, a composite resistance R1||Rc of the first balancing resistor R1 and the common resistor Rc may be less than the first balancing resistor R1, such that a balancing current of the first battery cell 111 may increase. Thus, the cell balancing speed of the first battery cell 111 may increase.

In addition, according to an embodiment, when both the first battery cell 111 and the second battery cell 112 are selected as target battery cells, the controller 125 may close all of the first resistive switch S1, the second resistive switch S2, the third resistive switch S3, and the fourth resistive switch S4. In this case, the first balancing resistor R1 may be connected in parallel to the common resistor 122, and the second balancing resistor R2 may be connected in parallel to the common resistor 122. The controller 125 may also close both the first balancing switch SW1 and the second balancing switch SW2. Thus, the cell balancing speeds of the first battery cell 111 and the second battery cell 112 may increase.

Figure 4:
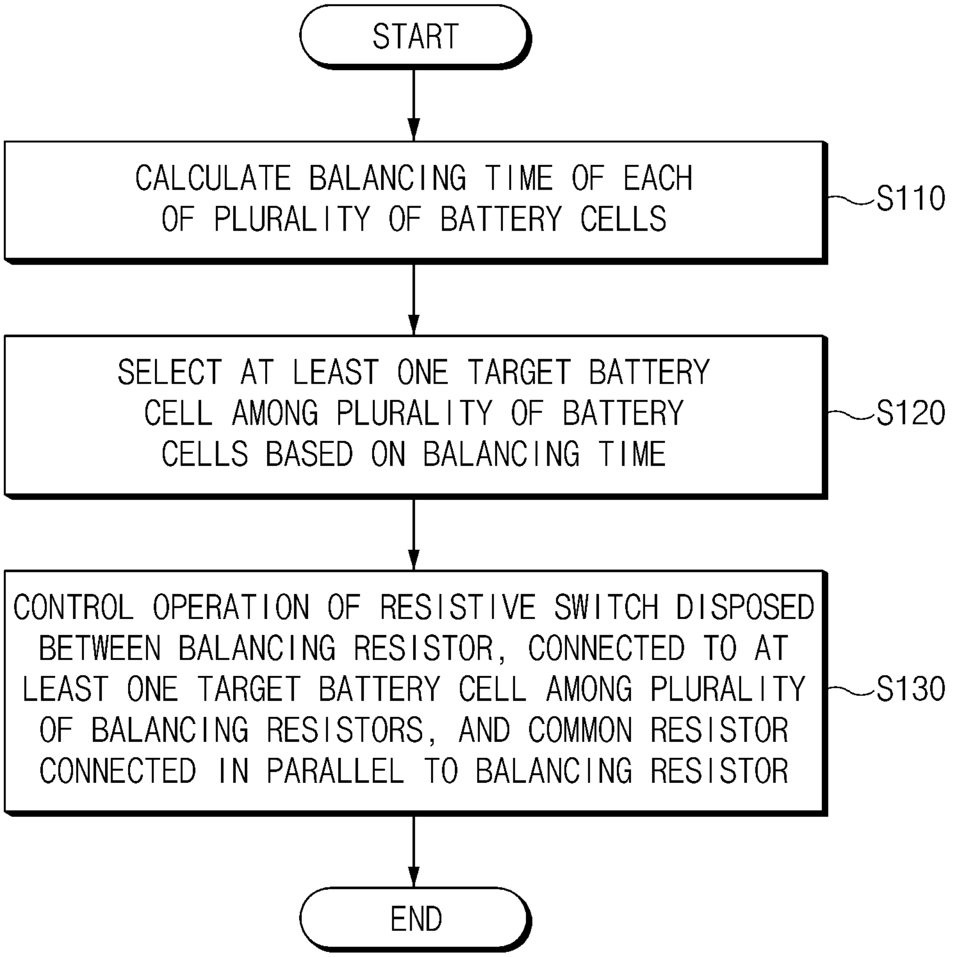
FIGS. 4 and 5 are flowcharts of an operating method of a battery management system according to an embodiment disclosed herein.
Figure 5:
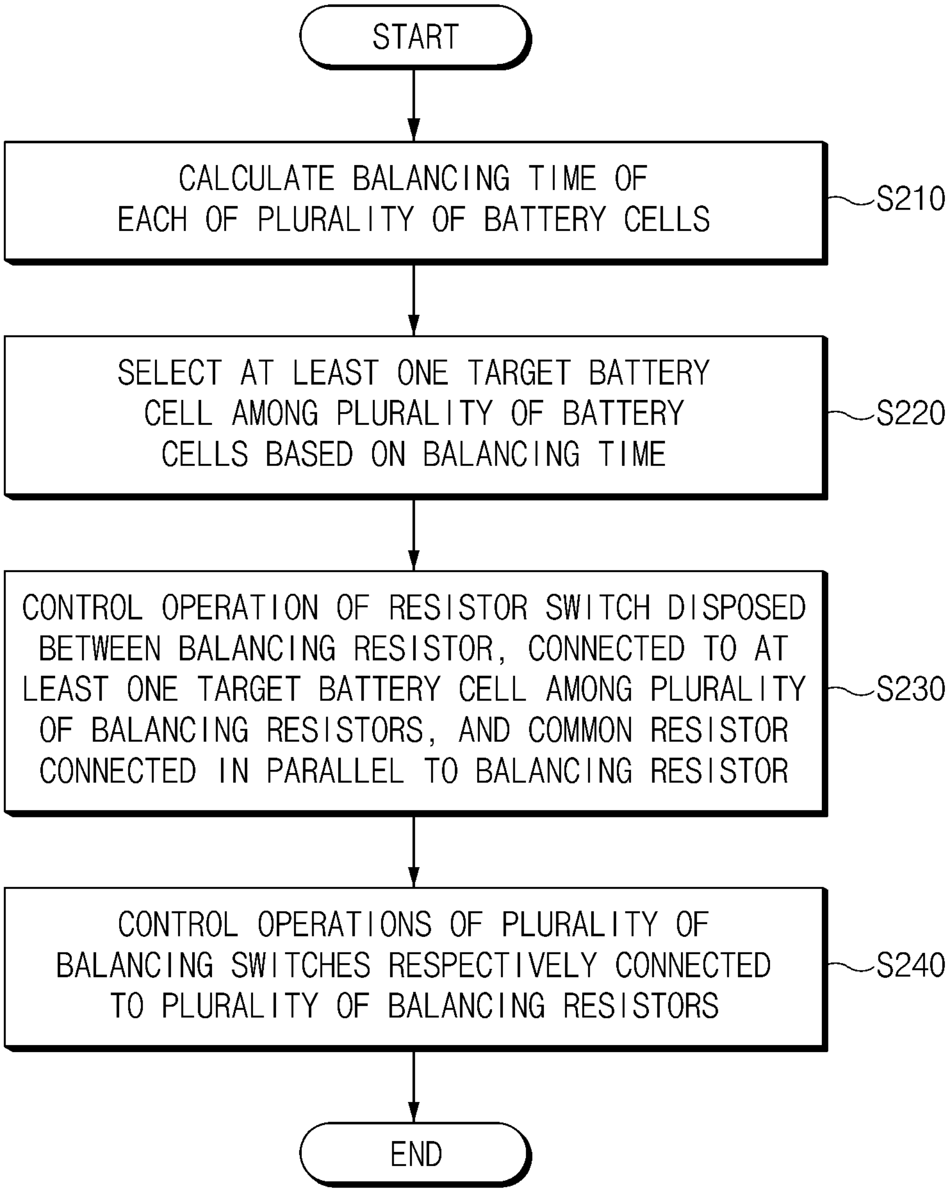

FIGS. 4 and 5 are flowcharts of an operating method of a battery management system according to an embodiment disclosed herein.

First, referring to FIG. 4, an operating method of a battery management apparatus according to an embodiment disclosed herein may include operation S110 of calculating a balancing time of each of a plurality of battery cells, operation S120 of selecting at least one target battery cell from among the plurality of battery cells based on a balancing time, and operation S130 of controlling an operation of a resistive switch disposed between a balancing resistor, connected to the at least one target battery cell among the plurality of balancing resistors, and a common resistor connected in parallel to the balancing resistor.

Hereinbelow, operations S110 through S130 will be described in detail with reference to FIG. 2.

In operation S110, the controller 125 may calculate a cell balancing time of each of the plurality of battery cells 111, 112, 113, and 114 (see FIG. 1). For example, the controller 125 may calculate a cell balancing time based on an SOC, a battery capacity, and a balancing efficiency of each of the plurality of battery cells 111, 112, 113, and 114.

In operation S120, the controller 125 may select at least one target battery cell based on the calculated cell balancing time. The controller 125 may select, as at least one target battery cell, a battery cell having a balancing time different from those of other battery cells by a reference value or greater, from among the plurality of battery cells 111, 112, 113, and 114.

Meanwhile, according to an embodiment, the controller 125 may select a battery cell having a maximum cell balancing time and a battery cell having a minimum cell balancing time among the plurality of battery cells 111, 112, 113, and 114, and select the battery cell having the maximum balancing time as a target battery cell. In addition, according to an embodiment, the controller 125 may select, as target battery cells, battery cells having cell balancing times greater than or equal to a preset value among the plurality of battery cells 111, 112, 113, and 114.

In operation S130, the controller 125 may control operations of the plurality of resistive switches 123 to electrically connect the balancing resistor R1, connected to at least one target battery cell (e.g., the first battery cell 111) among the plurality of balancing resistors 121, with the common resistor RC. For example, when the first battery cell 111 is selected as a target battery cell, the controller 125 may close the first resistive switch S1 and the second resistive switch S2.

The controller 125 may control operations of the plurality of resistive switches 123 to avoid electrical connection between a balancing resistor R2 connected to a battery cell (e.g., the second battery cell 112) other than the at least one target battery cell (e.g., the first battery cell 111) among the plurality of balancing resistors 121, and the common resistor RC. For example, when the first battery cell 111 is selected as the target battery cell, the controller 125 may open the third resistive switch S3 and the fourth resistive switch S4.

In addition, according to an embodiment, when both the first battery cell 111 and the second battery cell 112 are selected as target battery cells, the controller 125 may close all of the first resistive switch S1, the second resistive switch S2, the third resistive switch S3, and the fourth resistive switch S4. In this case, the first balancing resistor R1 may be connected in parallel to the common resistor 122, and the second balancing resistor R2 may be connected in parallel to the common resistor 122. The controller 125 may also close both the first balancing switch SW1 and the second balancing switch SW2.

Referring to FIG. 5, an operating method of a battery management apparatus according to an embodiment disclosed herein may include operation S210 of calculating a balancing time of each of a plurality of battery cells, operation S220 of selecting at least one target battery cell from among the plurality of battery cells based on a balancing time, operation S230 of controlling an operation of a resistive switch disposed between a balancing resistor, connected to the at least one target battery cell among the plurality of balancing resistors, and a common resistor connected in parallel to the balancing resistor, and operation S240 of controlling operations of a plurality of balancing switches connected to the plurality of balancing resistors, respectively.

That is, an embodiment shown in FIG. 5, when compared to the embodiment shown in FIG. 4, may further include operation S240.

Hereinbelow, operations S210 through S240 will be described in detail with reference to FIG. 2. However, operations S210 and S220 may be substantially the same as operations S110 and S120 described with reference to FIG. 4, and thus operations S230 and S240 will be described in detail to avoid redundant description.

In operation S230, the controller 125 may control operations of the plurality of resistive switches 123 to electrically connect the balancing resistor R1, connected to at least one target battery cell (e.g., the first battery cell 111) among the plurality of balancing resistors 121, with the common resistor RC. For example, when the first battery cell 111 is selected as a target battery cell, the controller 125 may close the first resistive switch S1 and the second resistive switch S2.

In addition, according to an embodiment, when both the first battery cell 111 and the second battery cell 112 are selected as target battery cells, the controller 125 may close all of the first resistive switch S1, the second resistive switch S2, the third resistive switch S3, and the fourth resistive switch S4. In this case, the first balancing resistor R1 may be connected in parallel to the common resistor 122, and the second balancing resistor R2 may be connected in parallel to the common resistor 122.

In operation S240, the controller 125 may control operations of the plurality of balancing switches 124. For example, when the first battery cell 111 is selected as a target battery cell, the controller 125 may close the first balancing switch SW1. When the first balancing switch SW1 is closed, cell balancing may be performed on the first battery cell 111. That is, when the first resistive switch S1 and the second resistive switch S2 are closed, the first balancing resistor R1 and the common resistor Rc 122 may be connected in parallel. In this case, a composite resistance R1||Rc of the first balancing resistor R1 and the common resistor Rc may be less than the first balancing resistor R1, such that a balancing current of the first battery cell 111 may increase. Thus, the cell balancing speed of the first battery cell 111 may increase.

Meanwhile, when the first battery cell 111 is selected as a target battery cell and thus the third resistive switch S3 and the fourth resistive switch S4 are opened, the controller 125 may short-circuit the second balancing switch SW2 to perform a cell balancing operation on the second battery cell 112 when cell balancing for the second battery cell 112 is required.

In addition, when both the first battery cell 111 and the second battery cell 112 are selected as target battery cells, the controller 125 may close both the first balancing switch SW1 and the second balancing switch SW2. Thus, the cell balancing speeds of the first battery cell 111 and the second battery cell 112 may increase.

Figure 6:
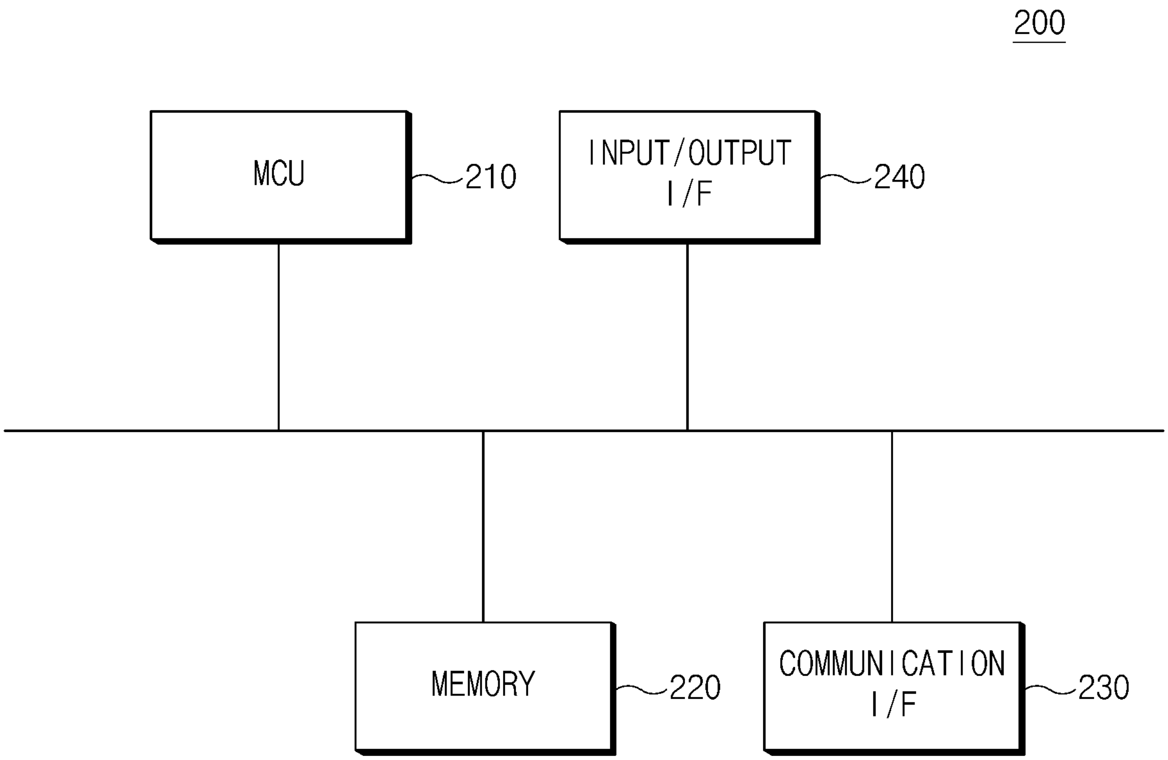
FIG. 6 illustrates a computing system that executes an operating method of another battery management apparatus according to an embodiment disclosed herein.

FIG. 6 illustrates a computing system that executes another battery management method, according to an embodiment disclosed herein.

Referring to FIG. 6, a computing system 200 according to an embodiment disclosed herein may include a micro control unit (MCU) 210, a memory 220, an input/output interface (I/F) 230, and a communication I/F 240.

The MCU 210 may be a processor that executes various programs (e.g., an SOH calculation program, a cell balancing target determination program, etc.) stored in the memory 220, processes various data including an SOC, an SOH, etc., of a plurality of battery cells through these programs, executes functions of the battery management apparatus 120 described above with reference to FIGS. 1 to 3, or executes the battery management method described with reference to FIGS. 4 and 5.

The memory 220 may store various programs regarding SOH calculation of the battery cell, cell balancing target determination, etc. Moreover, the memory 220 may store various data such as SOC data, SOH data, etc., of each battery cell.

The memory 220 may be provided in plural, depending on a need. The memory 220 may be a volatile memory or a nonvolatile memory. For the memory 220 as the volatile memory, random access memory (RAM), dynamic RAM (DRAM), static RAM (SRAM), etc., may be used. For the memory 220 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 220 are merely examples and are not limited thereto.

The input/output I/F 230 may provide an interface for transmitting and receiving data by connecting an input device (not shown) such as a keyboard, a mouse, a touch panel, etc., and an output device such as a display (not shown), etc., with the MCU 210.

The communication I/F 230, which is a component capable of transmitting and receiving various data to and from a server, may be various types of devices capable of supporting wired or wireless communication. For example, a program for SOH calculation of the battery cell or balancing target determination or various data, etc., may be transmitted and received to and from a separately provided external server through the communication I/F 230.

As such, the battery management method according to an embodiment disclosed herein may be recorded in the memory 220 and executed by the MCU 210.

The above description is merely illustrative of the technical idea of the present disclosure, and various modifications and variations will be possible without departing from the essential characteristics of embodiments of the present disclosure by those of ordinary skill in the art to which the embodiments disclosed herein pertains.

Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present disclosure.

The invention claimed is:

1. A battery management apparatus comprising:

a plurality of balancing resistors respectively connected to a plurality of battery cells;

a common resistor connected in parallel to the plurality of balancing resistors;

a plurality of resistive switches connected between the plurality of balancing resistors and the common resistor; and a controller configured to calculate balancing times of the plurality of battery cells and control operations of the plurality of resistive switches based on the balancing times, wherein the plurality of resistive switches includes more than one resistive switch connected to each of the plurality of balancing resistors between the plurality of balancing resistors and the common resistor.

2. The battery management apparatus of claim 1, wherein the controller is further configured to select at least one target battery cell among the plurality of battery cells based on the balancing times of the plurality of battery cells.

3. The battery management apparatus of claim 2, wherein the controller is further configured to select, as the at least one target battery cell, a battery cell having a balancing time that is different from balancing times of other battery cells by a reference value or greater among the plurality of battery cells.

4. The battery management apparatus of claim 3, wherein the controller is further configured to control the operations of the plurality of resistive switches to electrically connect a balancing resistor, connected to the at least one target battery cell among the plurality of balancing resistors, with the common resistor.

5. The battery management apparatus of claim 3, wherein the controller is further configured to control the operations of the plurality of resistive switches to avoid electrical connection between a balancing resistor connected to a battery cell other than the at least one target battery cell among the plurality of balancing resistors and the common resistor.

6. The battery management apparatus of claim 3, further comprising a plurality of balancing switches respectively connected to the plurality of balancing resistors.

7. The battery management apparatus of claim 6, wherein the controller is further configured to close a balancing switch connected to a respective one of the balancing resistors connected to the at least one target battery cell among the plurality of balancing switches, when controlling the operations of the plurality of resistive switches to electrically connect the respective balancing resistor with the common resistor.

8. The battery management apparatus of claim 1, further comprising a plurality of balancing switches respectively connected in series to the plurality of balancing resistors.

9. The battery management apparatus of claim 1, wherein the plurality of balancing resistors includes:

a first balancing resistor connected to a positive terminal of the plurality of battery cells; and a second balancing resistor connected to a negative terminal of the plurality of battery cells.

10. The battery management apparatus of claim 9, wherein the plurality of resistive switches includes:

a first resistive switch connected between a first terminal of the first balancing resistor and the common resistor;

a second resistive switch connected between a second terminal of the first balancing resistor and the common resistor;

a third resistive switch connected between a first terminal of the second balancing resistor and the common resistor; and a fourth resistive switch connected between a second terminal of the second balancing resistor and the common resistor.

11. The battery management apparatus of claim 10, wherein the first resistive switch and the second resistive switch are opened and closed simultaneously by the controller, and wherein the third resistive switch and the fourth resistive switch are opened and closed simultaneously by the controller.

12. An operating method of a battery management apparatus, the operating method comprising:

calculating balancing times of a plurality of battery cells;

selecting at least one target battery cell among the plurality of battery cells, based on the balancing times; and controlling an operation of a plurality of resistive switches disposed between a balancing resistor of a plurality of balancing resistors, connected to the at least one target battery cell among the plurality of battery cells, and a common resistor connected in parallel to the balancing resistor, wherein the plurality of resistive switches includes more than one resistive switch connected to each of the plurality of balancing resistors between the plurality of balancing resistors and the common resistor.

13. The operating method of claim 12, wherein the selecting of the at least one target battery cell among the plurality of battery cells based on the balancing times comprises selecting, as the at least one target battery cell, a battery cell having a balancing time that is different from balancing times of other battery cells by a reference value or greater among the plurality of battery cells.

14. The operating method of claim 13, wherein the controlling of the operation of the plurality of resistive switches disposed between the balancing resistor, connected to the at least one target battery cell among the plurality of balancing resistors, and the common resistor connected in parallel to the balancing resistor comprises closing a resistive switch to electrically connect the balancing resistor connected to the at least one target battery cell with the common resistor.

15. The operating method of claim 14, further comprising controlling operations of a plurality of balancing switches respectively connected to the plurality of balancing resistors.

16. The operating method of claim 15, wherein the controlling of the operations of the plurality of balancing switches respectively connected to the plurality of balancing resistors comprises closing a balancing switch connected to the balancing resistor connected to the at least one target battery cell among the plurality of balancing switches, when controlling the operations of the plurality of resistive switches to electrically connect the balancing resistor, connected to the at least one target battery cell among the plurality of balancing resistors, with the common resistor.

* * * * *